Patented July 29, 1924.

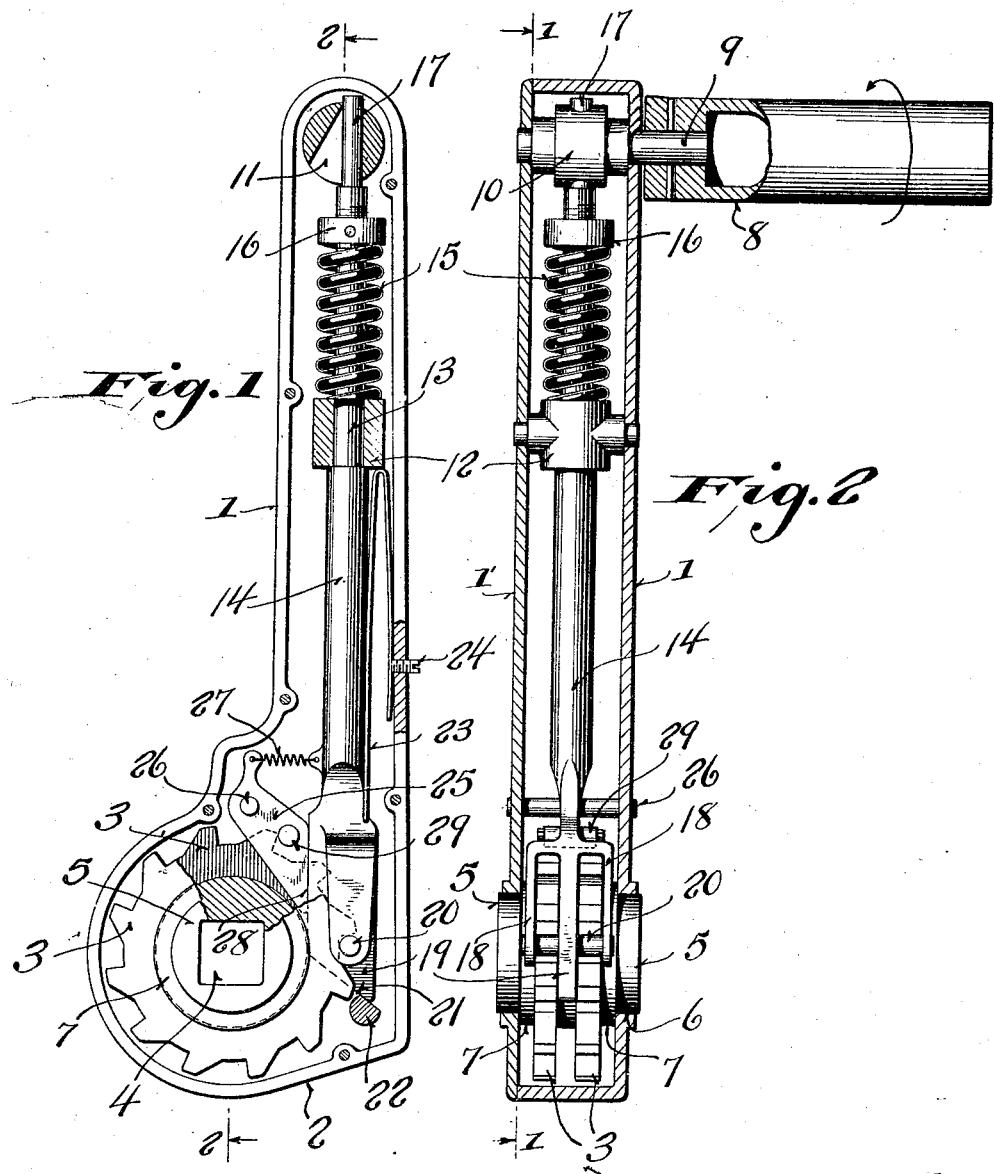

1,503,205

UNITED STATES PATENT OFFICE.

EDWARD E. NELDNER AND VINCENT NELDNER, OF MILWAUKEE, WISCONSIN.

SAFETY CRANK.

Application filed May 3, 1923. Serial No. 636,291.

*To all whom it may concern:*

Be it known that we, EDWARD E. NELDNER and VINCENT NELDNER, both citizens of the United States, and residents of Milwaukee, in the county of Milwaukee and State of Wisconsin, have invented certain new and useful Improvements in Safety Cranks; and we do hereby declare that the following is a full, clear, and exact description thereof.

This invention relates to safety cranks for internal combustion engines and is particularly directed to safety cranks for automobile engines.

This invention is an improvement over that disclosed in a copending application filed jointly by us on November 17th, 1922, Serial Number 601,501, for safety crank, and has in general the same objects as those of such invention.

Objects of this invention are to provide means which will ensure the disconnecting of the crank from the engine shaft in the event of a back fire; to provide a plurality of cooperating means any of which, in the event of failure of the others, will effect the disconnecting of the crank from the engine shaft; and to provide a construction of safety crank in which all of the parts may be made of substantial and rugged construction.

Further objects are to provide a safety crank so constructed that all of its parts may be made by simple machine shop operations; to provide a device which is of simple construction and in which a minimum number of parts are employed.

An embodiment of the invention is shown in the accompanying drawings, in which—

Figure 1 is a side elevation particularly in section of the safety crank with the cover removed, such view corresponding roughly to a section on the line 1—1 of Figure 2.

Figure 2 is a transverse sectional view through the crank, such view being approximately taken on line 2—2 of Figure 1.

Referring more particularly to the drawings, it will be seen that the crank comprises a casing having an elongated arm or extension 1 and an enlarged housing 2. Within the housing 2 of the casing, a ratchet wheel 3 provided with a square aperture 4 for the reception of the engine shaft, is mounted. This ratchet wheel is provided with cylindrical projections 5 upon each side thereof which constitute trunnions and are received in bearings 6 formed in the casing. The ratchet wheel is held in position by means of flanges 7 of larger diameter than the cylindrical portion 5, such flanges being adapted to bear upon the inside of the casing and thereby position the ratchet wheel against axial displacement. The casing may conveniently be formed with a removable cover 1' which conforms to the outline of the elongated portion 1 and the housing, or enlargement 2 and completely closes one side of the casing, as may be seen from Figure 2, thereby providing a convenient means of access to the interior thereof in assembling and in repairing.

The upper portion of the crank is provided with a manipulating handle 8 which is readily secured to a transverse pin, or shaft 9. This shaft is provided with an enlarged cylindrical portion 10 interiorly of the casing and this portion is apertured, as indicated at 11 in Figure 1 to provide a substantially triangular shaped cut-out therethrough with the other portion of the cut-out directed inwardly of the crank. At a point intermediate the ends of the crank a bearing 12 is pivotally mounted and is provided with a central cylindrical aperture through which a correspondingly shaped portion 13 of an elongated bar slidably extends. This bar, or rod, is provided with an enlarged portion 14 and a shoulder is formed at the union of the portions 13 and 14 to act as a stop against the bearing 12 when the rod is urged outwardly, or in the position shown in the drawings—upwardly. The means for urging the rod upwardly may comprise a relatively stiff helical spring 15 loosely surrounding the portion 13 and seating, at its inner end, against the bearing 12 and at its outer end, against an adjustable collar 16, carried by a threaded portion of the longitudinally extending bar. The outer end of the bar is further reduced to provide a projecting portion 17 which is passed through the aperture 11 of the shaft 9 which carries the manipulating handle.

It is to be noted from the drawings that the ratchet wheel 3 is formed double—viz, two exactly similar, spaced ratchet wheels proper are provided. These ratchet wheels constitute, in effect, a single ratchet wheel and are preferably formed integral with each other and with the flanges 7 and trunnions 5, thus constituting a single unitary structure. The lower portion of the longitudinal bar is provided with tines, or arms, 18 and 19. The outer tines 18 are shorter than the inner, or central tines 19. This arm, or tine, is of greater extent laterally than the arms, or tines, 18, as may be seen from Figure 1 and is positioned between the portions 3 of the ratchet wheel. A pin 20 is readily secured to all three of the arms, or tines, and constitutes a projection carried by the bar for engaging the teeth of the ratchet wheel. It is to be noted that the lower portion of the arm, or tine, 19 is beveled, as indicated at 21 and cooperates with a similarly beveled face of a transversed pin 22 carried by the casing, so that, upon back firing of the engine and consequent depression of the bar 14 against the action of the spring 15, a cam action will take place between the central tine 19 and the pin 22, thereby moving the projection, or pin 20 out of the path of the teeth of the ratchet wheel 3 and effecting disconnection. If desired, a substantially U-shaped relatively light spring 23 may be provided to force the arm 14 into engagement with the ratchet wheel under normal conditions. This spring may be conveniently adjusted by means of a screw 24 threaded through the casing.

Additional means for ensuring the disconnecting of the bar from the ratchet wheel are provided in the form of a trip lever 25, which is pivotally carried by a pin 26 passed through the casing and is urged in a clockwise direction by means of a spring 27. The lower portion of this trip lever is provided with a flat face 28 normally contacting with the correspondingly flat face of the inner tine 19 of the bar 14. When, however, the engine back fires, this trip lever 25 will be rocked in a counter clockwise direction through the medium of the pin 29 carried by such lever and the teeth of the ratchet wheel thereby forcing the arm 14 outwardly from the ratchet wheel and effecting a disconnecting of the arm from the ratchet wheel.

Further means are provided for ensuring this disconnecting through the medium of the rotatable handle 8. It will be noted that when the handle rotates in the direction indicated by the arrow in Figure 2, that the upper portion of the projecting part 17 of the longitudinal bar will be locked to the left in Figure 1, thereby moving the lower portion in such figure outwardly away from the ratchet wheel. This rotation of the handle is automatically secured by the relative rolling action of the handle on the palm of the operator when the operator is pressing the crank downwardly and the engine back fires.

A further action secured by this apparatus is the cushioning afforded by the spring 15 which, although allowing a slight motion only of the longitudinally extending bar nevertheless, so cushions the bar that the shock due to back firing is materially reduced before it is imparted to the crank in the form of a sudden tendency to rotate. This feature materially aids in the smoothness and security of operation.

It will thus be seen that a safety crank has been provided for internal combustion engines which is thoroughly protected against damage, either to itself or to the operator in the case of back firing of the engine, which is adapted to cushion any sudden motion imparted to the crank by the engine shaft and it is so constructed that its parts are of sturdy and substantial design and are of relatively simple formation.

We claim:

1. A safety crank for internal combustion engines comprising a casing having a handle adjacent one end, a ratchet wheel carried by said casing adjacent its other end and adapted to engage the shaft of the internal combustion engine, a bearing pivotally mounted intermediate the ends of said casing, a bar slidably carried by said bearing, a helical spring surrounding said bar and urging said bar outwardly towards said handle, a projection carried by said bar for engaging said ratchet wheel and temporarily locking it relatively to said casing, cam means for disengaging said projection from said ratchet wheel when said bar is moved against the action of said spring, and a trip lever operated by said ratchet wheel for aiding in the disengaging when the engine back fires.

2. A safety crank for internal combustion engines comprising a casing having a revolubly mounted handle adjacent one end, a ratchet wheel carried by said casing adjacent the other end and adapted to engage the shaft of the internal combustion engine, a bearing pivotally mounted intermediate the ends of said casing, a bar slidably carried by said bearing, a helical compression spring surrounding said bar and attached thereto at one end and seating at its other end against said bearing, a projection carried by said bar for engaging said ratchet wheel to temporarily lock it relatively to said casing, cam means for disengaging said projection when said arm is moved against the action of said spring, a trip lever associated with said ratchet wheel and adapted to press against said bar when said ratchet wheel is reversely rotated to thereby disconnect said projection from said ratchet wheel, and means operated by said revolubly mounted handle for rocking said bar to move said projection from said ratchet wheel.

In testimony that we claim the foregoing we have hereunto set our hands at Milwaukee, in the county of Milwaukee and State of Wisconsin.

EDWARD E. NELDNER.
VINCENT NELDNER.